US009146582B2

(12) United States Patent  (10) Patent No.: US 9,146,582 B2
Liang et al.  (45) Date of Patent: Sep. 29, 2015

(54) PORTABLE ELECTRONIC DEVICE WITH DIFFERENT MODULES CAPABLE OF BEING DETACHED OR CONNECTED BY MAGNETIC ATTRACTION FORCE

(71) Applicant: Wistron Corporation, New Taipei (TW)

(72) Inventors: Chen-Yi Liang, New Taipei (TW); Chun-Chien Chen, New Taipei (TW); Cheng-Hsiang Chuang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 142 days.

(21) Appl. No.: 14/146,009

(22) Filed: Jan. 2, 2014

(65) Prior Publication Data

US 2015/0043140 A1  Feb. 12, 2015

(30) Foreign Application Priority Data

Aug. 8, 2013  (TW) .............................. 102128506 A

(51) Int. Cl.
  *G06F 1/16*  (2006.01)
(52) U.S. Cl.
  CPC .................................... *G06F 1/1601* (2013.01)
(58) Field of Classification Search
  USPC ............... 439/355, 65, 489, 633, 66, 328, 68; 257/40, 421; 361/679.55, 679.17, 361/679.27, 679.56, 679.09, 679.31, 679.3, 361/679.44, 679.4, 679.12, 679.43, 679.06, 361/679.01, 679.58, 679.2, 679.22, 679.59, 361/679.08; 455/575.8, 556, 575.7, 550.1, 455/575.1, 569.1, 575.4; 365/148, 158; 248/309.4, 316.7, 206.5, 304, 261, 248/213.2, 441.1; 312/247, 236, 292, 273, 312/321.5
  See application file for complete search history.

(56) References Cited

U.S. PATENT DOCUMENTS

| 2012/0068798 | A1  | 3/2012  | Lauder |
| 2014/0240923 | A1* | 8/2014  | Lin .......................... 361/679.55 |
| 2014/0313655 | A1* | 10/2014 | Chen ........................ 361/679.06 |
| 2014/0368995 | A1* | 12/2014 | Lin et al. .................. 361/679.55 |

FOREIGN PATENT DOCUMENTS

| TW | M427598 | 4/2012 |
| TW | M458065 | 7/2013 |

OTHER PUBLICATIONS

Office action mailed on Jun. 16, 2015 for the Taiwan application No. 102128506, filing date: Aug. 8, 2013, p. 1 line 1-14 and p. 2 line 1-20.

* cited by examiner

*Primary Examiner* — Hung Duong
(74) *Attorney, Agent, or Firm* — Winston Hsu; Scott Margo

(57) ABSTRACT

A portable electronic device includes a first module, a second module and a pivoting mechanism connected to the first module and the second module. The first module is detachably assembled with the second module. The pivoting mechanism includes a locating component, at least one first magnetic component and at least one second magnetic component. The locating component is disposed on the second module and has an accommodating slot. The at least one first magnetic component is disposed on the first module, and the at least one second magnetic component is disposed inside the accommodating slot for assembling the first module with the second module as the at least one first magnetic component is disposed on the accommodating slot and attracts the at least one second magnetic component, so that the first module pivots relative to the second module around the at least one first magnetic component.

16 Claims, 12 Drawing Sheets

PORTABLE ELECTRONIC DEVICE WITH DIFFERENT MODULES CAPABLE OF BEING DETACHED OR CONNECTED BY MAGNETIC ATTRACTION FORCE

BACKGROUND OF THE INVENTION

1. Field of the Invention

The present invention relates to a portable electronic device, and more specifically, to a portable electronic device with different modules capable of being detached or connected by magnetic attraction force.

2. Description of the Prior Art

It is common that a tablet computer is designed to be connected to a base or a keyboard module base, so that a combination of the tablet computer and the base can be used as a notebook computer. It also can facilitate a user to use the table computer in a fixed viewing and provide a text message input function. A conventional connecting mechanism for connecting the tablet computer with the base is utilizing an engaging component generally. However, as the tablet computer is to be detached from the base, it has to open the engaging component to detach the tablet computer from the base, and this operational mechanism is complicated and inconvenient. In addition, the tablet computer cannot rotate relative to the base, or the mechanism has a complicated component, such as a pivoting component, for rotating the tablet computer relative to the base. Hence, it needs more structural space and results in a problem of high cost of components. Therefore, it is an important issue to design a pivoting structure for rotating the tablet computer relative to the base with easy assembly.

SUMMARY OF THE INVENTION

The present invention is to provide a portable electronic device with different modules capable of being detached or connected by magnetic attraction force to solve above problems.

According to the disclosure, a portable electronic device includes a first module having a first side, a second module having a second side, and a pivoting mechanism. The pivoting mechanism is for connecting the first side of the first module with the second side of the second module, so that the first module is detachably and rotatably assembled with the second module, and the pivoting mechanism includes a locating component, at least one first magnetic component and at least one second magnetic component. The locating component is disposed on the second side of the second module, and at least one accommodating slot is formed on the locating component. The at least one first magnetic component is disposed on the first side of the first module and for detachably being contained inside the at least one accommodating slot. The at least one second magnetic component is disposed inside the at least one accommodating slot and for attracting the at least one first magnetic component magnetically as the at least one first magnetic component is contained inside the at least one accommodating slot, so that the first module is assembled with the second module and pivots relative to the second module around the at least one first magnetic component.

According to the disclosure, the pivoting mechanism further comprises a supporting component, a first end of the supporting component is pivotally connected to the first module, a second end of the supporting component is connected to the at least one first magnetic component, and the supporting component is for supporting the first module as the first module pivots relative to the first end of the supporting component so that the first side of the first module is disposed on a top surface of the second module.

According to the disclosure, an opening is formed on the at least one accommodating slot of the locating component and for accommodating the supporting component as the first module rotates relative to the second module in a first rotating direction over a predetermined angle.

According to the disclosure, a locating slot is disposed on the top surface of the second module and for receiving the first side of the first module as the first module pivots relative to the first end of the supporting component to be disposed on the second module, so as to locate the first module.

According to the disclosure, the first module is a touch display module, and the second module is a keyboard module.

According to the disclosure, the first module is a touch display module, and the second module is a host module.

According to the disclosure, the at least one second magnetic component comprises a plurality of second magnetic components disposed inside the at least one accommodating slot in pairs.

According to the disclosure, the plurality of second magnetic components is disposed on a side of an accommodating surface of the at least one accommodating slot, and an included angle formed between each pair of the plurality of second magnetic components arranged along the accommodating surface is less than 180 degrees.

According to the disclosure, the at least one accommodating slot is a U-shaped slot and comprises two accommodating surfaces facing to each other, and at least one second magnetic component is disposed under each accommodating surface.

According to the disclosure, the pivoting mechanism further comprises a supporting component, a first end of the supporting component is pivotally connected to the first module, a second end of the supporting component is connected to the at least one first magnetic component, two openings are formed on two sides of the at least one accommodating slot respectively and for accommodating the supporting component as the first module rotates relative to the second module in a first rotating direction over a predetermined angle.

According to the disclosure, the at least one first magnetic component and the at least one second magnetic component are a pivotal shaft structure, as the first module rotates over a predetermined angle in a first rotating direction by the shaft structure, the first side of the first module contacts a corner of the locating component to form a fulcrum, so that the first module separates from the second module by overcoming a magnetic attraction force between the at least one first magnetic component and the at least one second magnetic component.

According to the disclosure, two accommodating slots are formed on the locating component, and the portable electronic device includes two first magnetic components and two pairs of second magnetic components. The two first magnetic components are disposed on two ends of the first side of the first module corresponding to the two accommodating slots. Each pair of second magnetic components is disposed inside the corresponding accommodating slot and for attracting the corresponding first magnetic component as the corresponding first magnetic component is disposed in the corresponding accommodating slot, so that the first module is assembled with the second module and pivots relative to the second module around the two first magnetic components.

According to the disclosure, the portable electronic device further includes two locating holes and two locating columns. The two locating holes are disposed on the two ends of the first side of the first module. The two locating columns are disposed on two ends of the second side of the second module and for inserting into the two locating holes respectively as the two pairs of second magnetic components attract the two first magnetic components, so that the first module is rotatably connected to the second module.

According to the disclosure, one of the at least one first magnetic component and the at least one second magnetic component is an active magnetic component, and the other one of the at least one first magnetic component and the at least one second magnetic component is an active magnetic component or a passive magnetic component.

According to the disclosure, the active magnetic component is a magnet, and the passive magnetic component is a metal component capable of being attracted by the magnet.

According to the disclosure, the magnet is a strip-shaped magnet, a U-shaped magnet or a trapezoid magnet.

The present invention disposes the first magnetic component on the first module and the second magnetic component on the second module, and the first module can contact and be assembled with the second module easily by the magnetic attraction force between the first magnetic component and the second magnetic component, so that the first module can rotate relative to the second module and provide the torque. As the first module is to be detached from the second module, it only needs to rotate the first module in the first rotating direction over the predetermined angle. Then, the first module rotates around the corner as a leverage effect, so that the first module is separated from the second module by the reverse torque. Therefore, it solves the problems that the tablet computer cannot be separated from the base easily, the tablet computer cannot rotate relative to the base, and the structural design needs more structural space and high cost, in the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
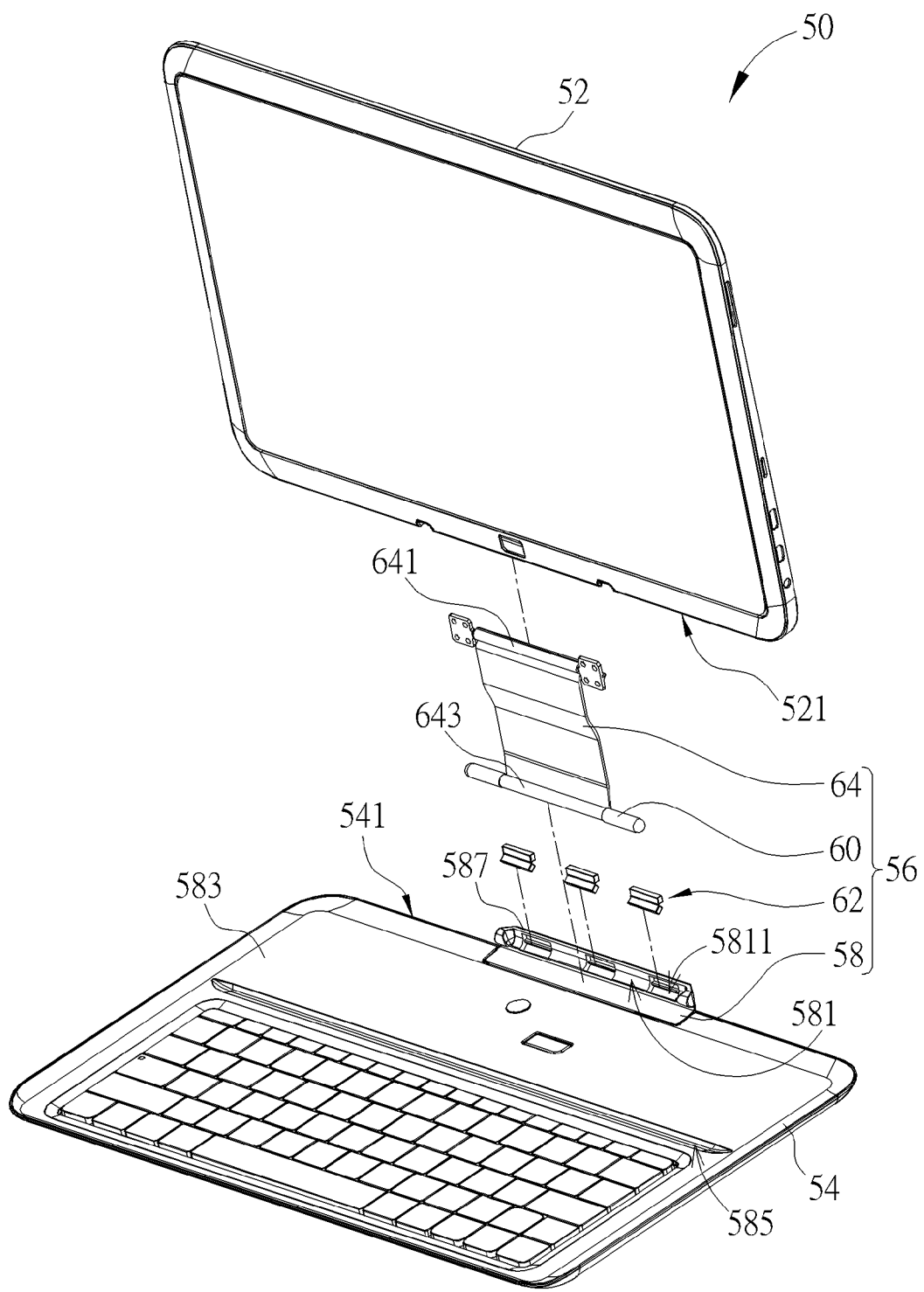
FIG. 1 is an exploded diagram of a portable electronic device according to an embodiment of the present invention.
Figure 2:
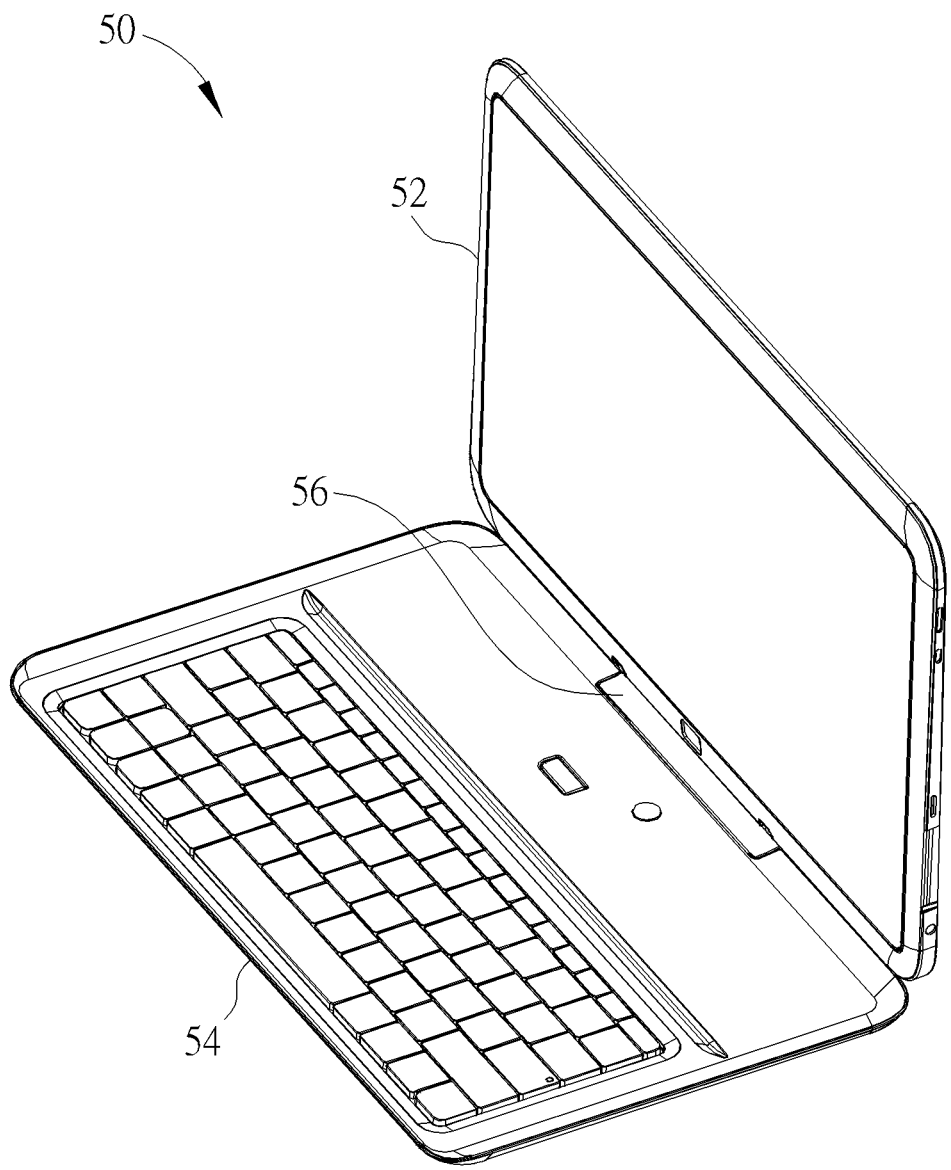
FIG. 2 is a diagram of the portable electronic device according to the embodiment of the present invention.
Figure 3:
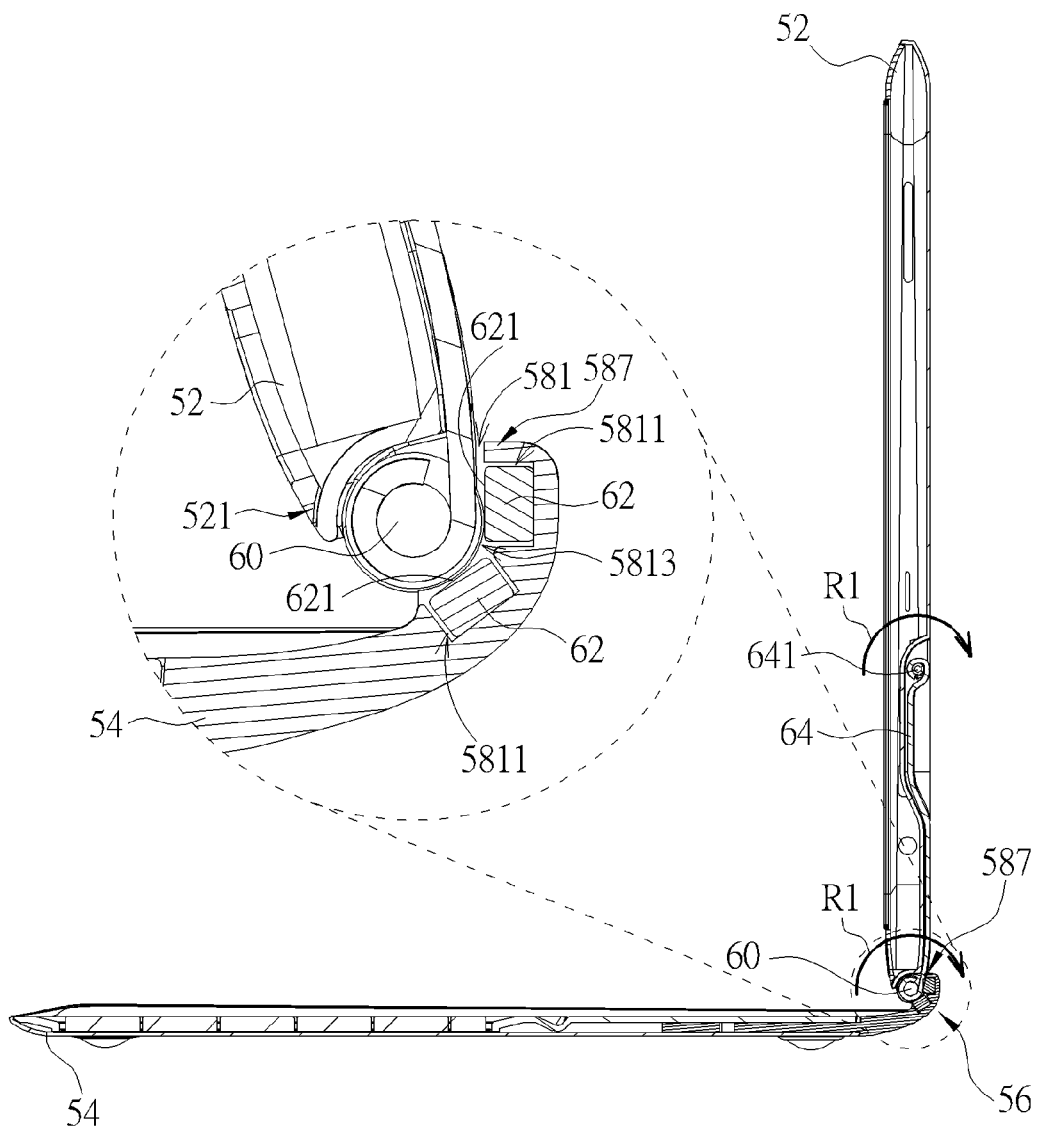
FIG. 3 is a sectional view of the portable electronic device in an open state according to the embodiment of the present invention.
Figure 4:
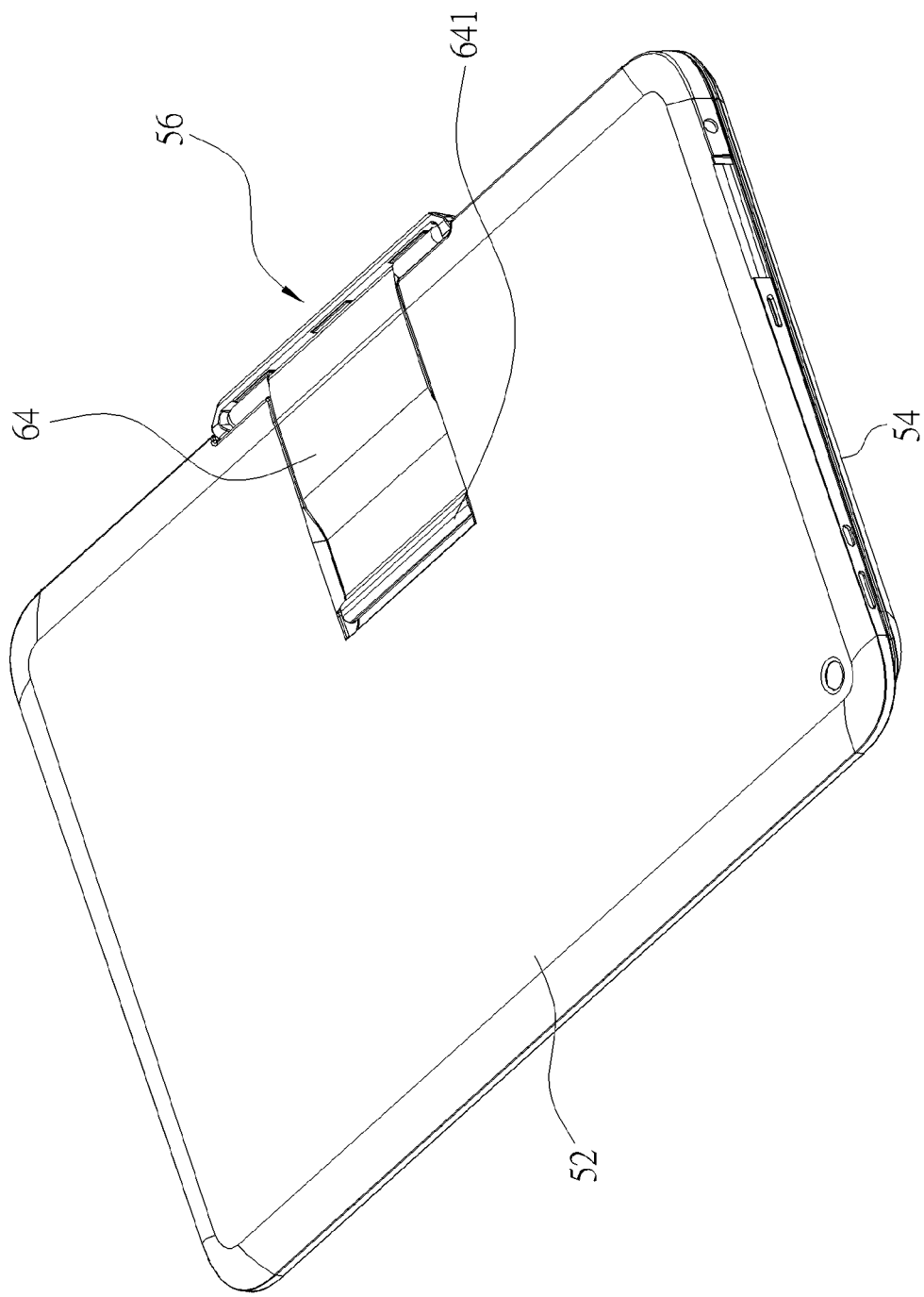
FIG. 4 is a diagram of the portable electronic device in a closed state according to the embodiment of the present invention.
Figure 5:
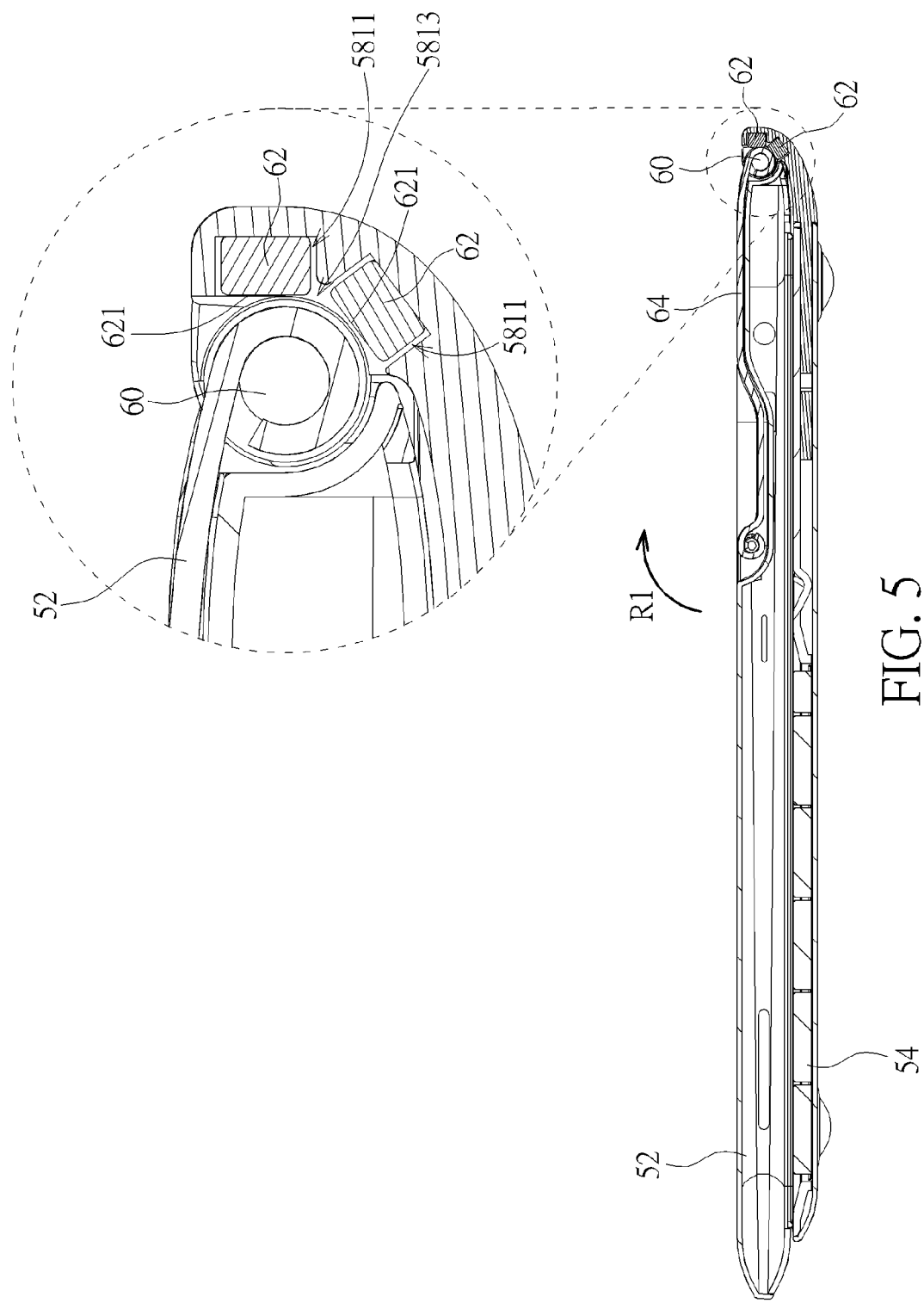
FIG. 5 is a sectional view of the portable electronic device in the closed state according to the embodiment of the present invention.

Please refer to FIG. 1 to FIG. 5. FIG. 1 is an exploded diagram of a portable electronic device 50 according to an embodiment of the present invention. FIG. 2 is a diagram of the portable electronic device 50 according to the embodiment of the present invention. FIG. 3 is a sectional view of the portable electronic device 50 in an open state according to the embodiment of the present invention. FIG. 4 is a diagram of the portable electronic device 50 in a closed state according to the embodiment of the present invention. FIG. 5 is a sectional view of the portable electronic device 50 in the closed state according to the embodiment of the present invention. The portable electronic device 50 includes a first module 52, a second module 54 and a pivoting mechanism 56. The first module 52 includes a first side 521, and the second module 54 includes a second side 541. The pivoting mechanism 56 is for connecting the first side 521 of the first module 52 with the second side 541 of the second module 54, so that the first module 52 is detachably and rotatably assembled with the second module 54. Therefore, the first module 52 can pivot relative to the second module 54 by the pivoting mechanism 56. For example, the first module 52 can pivot relative to the second module 54 to the open state as shown in FIG. 3 or to the closed state as shown in FIG. 5. The first module 52 can be a touch display module, such as a portable tablet computer, and the second module 54 can be an expansion device, such as a base, a keyboard module, a host module or a speaker module. In this embodiment, the second module 54 is the keyboard module. As a user only desires to use the touch display module, it only needs to detach the touch display module from the keyboard module. As the user desires to use the portable electronic device 50 as a notebook computer, it only needs to install the touch display module on the keyboard module.

As shown in FIG. 1, the pivoting mechanism 56 includes a locating component 58, at least one first magnetic component 60 and at least one second magnetic component 62. The first magnetic component 60 can be one of an active magnetic component and a passive magnetic component, the second magnetic component 62 can also be one of an active magnetic component and a passive magnetic component accordingly, but the first magnetic component 60 and the second magnetic component 62 cannot be the passive magnetic component at the same time. That is, at least one of the first magnetic component 60 and the second magnetic component 62 is the active magnetic component, and the other one can be the active magnetic component or the passive magnetic component. For example, the active magnetic component can be a magnet, and the passive magnetic component can be a metal component capable of being attracted by the magnet, such as an iron component. Furthermore, the magnet can be a strip-shaped magnet, a U-shaped magnet or a trapezoid magnet, but is not limited to it.

Figure 6:
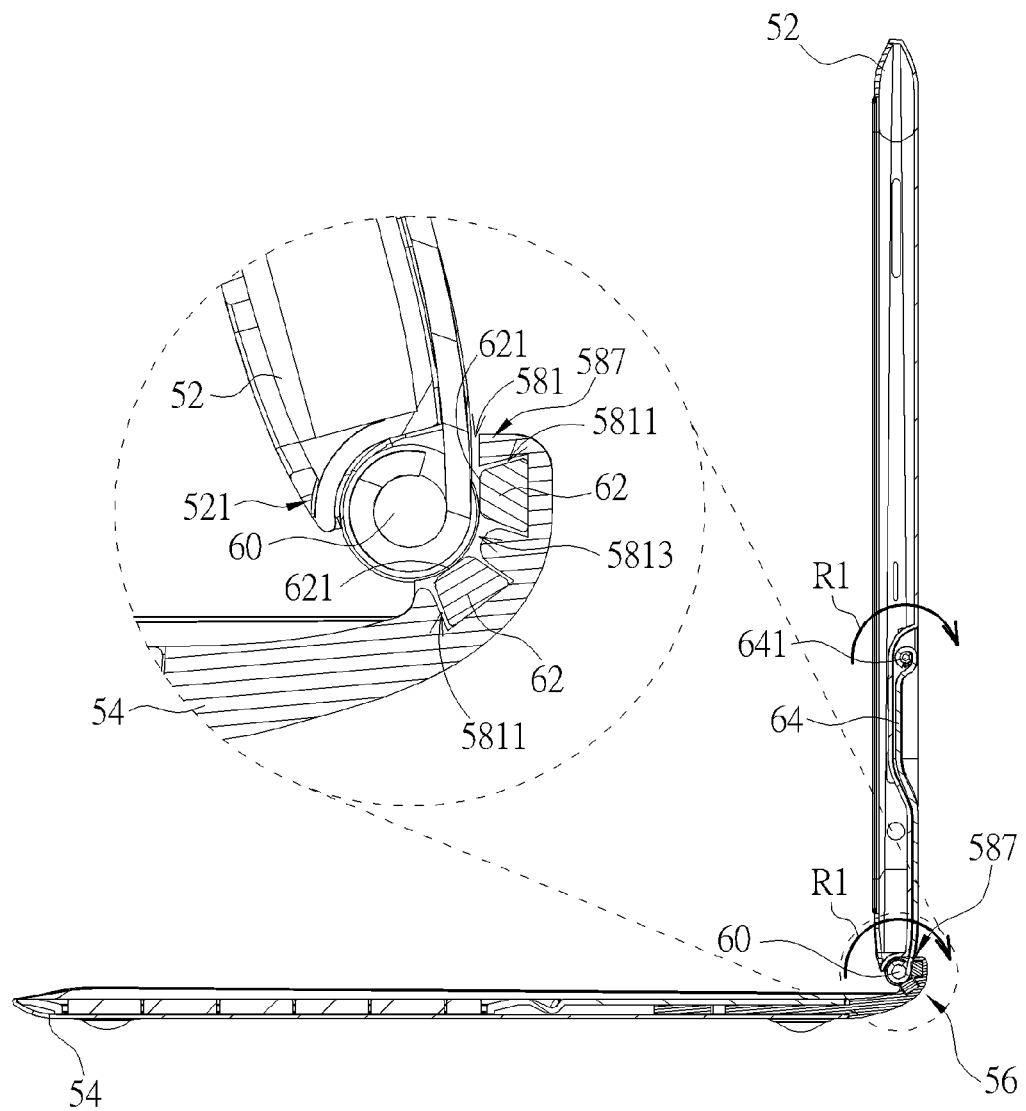
FIG. 6 is a sectional view of second magnetic components and installing slots according to another embodiment of the present invention.

Please refer to FIG. 6. FIG. 6 is a sectional view of the second magnetic components 62 and installing slots 5811 according to another embodiment of the present invention. As the second magnetic component 62 is the active magnetic component and the trapezoid magnet installed inside the corresponding installing slot 5811, a shape of the installing slot 5811 corresponding to the trapezoid magnet is a trapezoid slot structure, so that an opening of the installing slot 5811 near the first side 521 is smaller than a bottom of the installing slot 5811. That is, a width of the installing slot 5811 is decreasing toward the opening. Therefore, as the second magnetic component 62 is installed inside the installing slot 5811, the second magnetic component 62 whose width is decreasing toward the opening is constrained by the opening and cannot be separated from the locating component 58 easily. Furthermore, the portable electronic device 50 can include a plurality of second magnetic components 62 connected to the at least one first magnetic component 60 by magnetic attraction force. In this embodiment, the portable electronic device 50 of the present invention can include a first magnetic component 60 and two pairs of the second magnetic components 62. In this embodiment, the second magnetic component 62 can be a magnet preferably, and the first magnetic component 60 can be the magnet or the iron component.

The locating component 58 is disposed on the second side 541 of the second module 54, and an accommodating slot 581 is formed on the locating component 58. The first magnetic component 60 is disposed on the first side 521 of the first module 52 and is detachably accommodated inside the accommodating slot 581, so that the first module 52 is connected to the second module 54 by the first magnetic component 60, as shown in FIG. 2. As shown in FIG. 1, three pairs of the installing slots 5811 are disposed and spaced inside the accommodating slot 581, so as to accommodate six second magnetic components 62. The six second magnetic components 62 are for attracting the first magnetic component 60 magnetically as the first magnetic component 60 is accommodated inside the accommodating slot 581, so that the first module 52 is assembled with the second module 54 and pivots relative to the second module 54 by the first magnetic component 60. As shown in FIG. 1, the first magnetic component 60 can be a shaft rod structure. As the first magnetic component 60 is accommodated inside the accommodating slot 581, the first magnetic component 60 can be combined with the six second magnetic components 62 to be as a pivotal shaft structure, so that the first module 52 can pivot relative to the second module 54 by the pivotal shaft structure.

The second magnetic components 62 are arranged as shown in FIG. 3, each pair of the two second magnetic components 62 is disposed along an curved accommodating surface 5813 of the accommodating slot 581, and a magnetic surface 621 of each second magnetic component 62 is substantially aligned with the curved accommodating surface 5813. The magnetic surface 621 of each second magnetic component 62 can also be recessed in or protruded outside the curved accommodating surface 5813 slightly. Besides, an angle between the two magnetic surfaces 621 of the two second magnetic components 62 of the same pair is less than 180 degrees. Therefore, as the first magnetic component 60 is disposed inside the accommodating slot 581 and is attracted by the second magnetic components 62, the two magnetic surfaces 621 of the two second magnetic components 62 of the same pair attract the first magnetic component 60 in two different directions. This arrangement of the second magnetic components 62 can ensure that the first magnetic component 60 is attracted by the second magnetic components 62 tightly no matter what angle the first magnetic component 60 rotates to, so as to enhance stability and a torque of the first module 52 and the second module 54. That is, as the first module 52 rotates relative to the second module 54 to different angles, the first magnetic component 60 and the second magnetic components 62 keep attracting each other, so as to prevent the first module 52 from separating from the second module 54 in a procedure of rotation, and the first module 52 can be stably fixed at any angle. As the portable electronic device 50 is to be used, the user can rotate the first module 52 in a first rotating direction R1 relative to the second module 54 to the open state as shown in FIG. 3.

Figure 7:
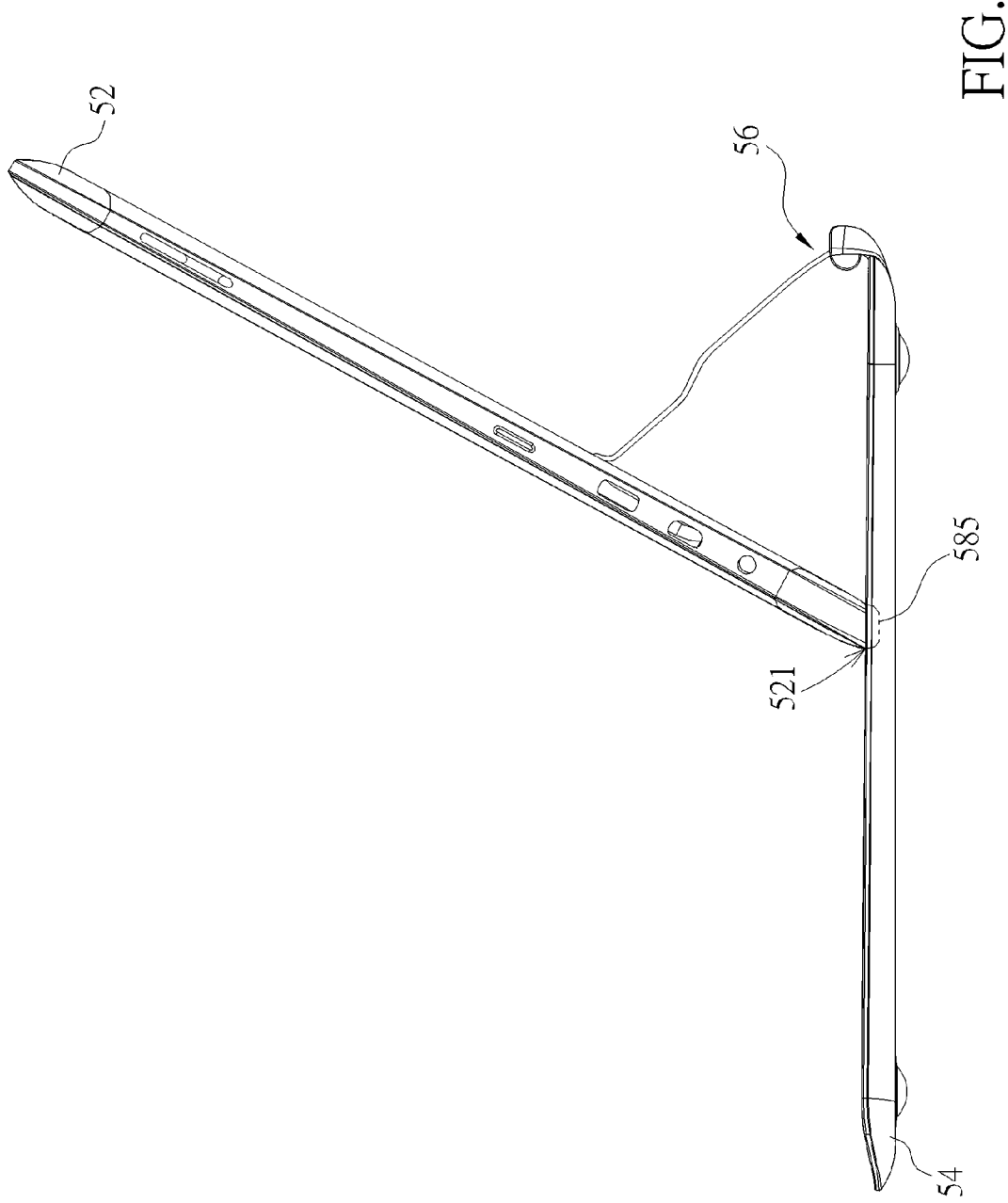
FIG. 7 is a side view of a first module fixed on a second module according to the embodiment of the present invention.

Furthermore, as shown in FIG. 1 and FIG. 4, a locating slot 585 is disposed on a top surface 583 of the second module 54, and the pivoting mechanism 56 can further include a supporting component 64. A first end 641 of the supporting component 64 is pivotally connected to the first module 52, and a second end 643 of the supporting component 64 is connected to the first magnetic component 60. The supporting component 64 is for supporting the first module 52 as the first module 52 pivots relative to the first end 641 of the supporting component 64 so that the first side 521 of the first module 52 is disposed on the top surface 583 of the second module 54. Please refer to FIG. 7. FIG. 7 is a side view of the first module 52 fixed on the second module 54 according to the embodiment of the present invention. As the portable electronic device 50 is operated as the notebook computer and the first module 52 is to be fixed on the second module 54 more stably, the first module 52 can rotate relative to the first end 641 of the supporting component 64 in the first rotating direction R1, and then the first side 521 is received by the locating slot 585, so that the first module 52 is located on the second module 54 stably, as shown in FIG. 7.

Figure 8:
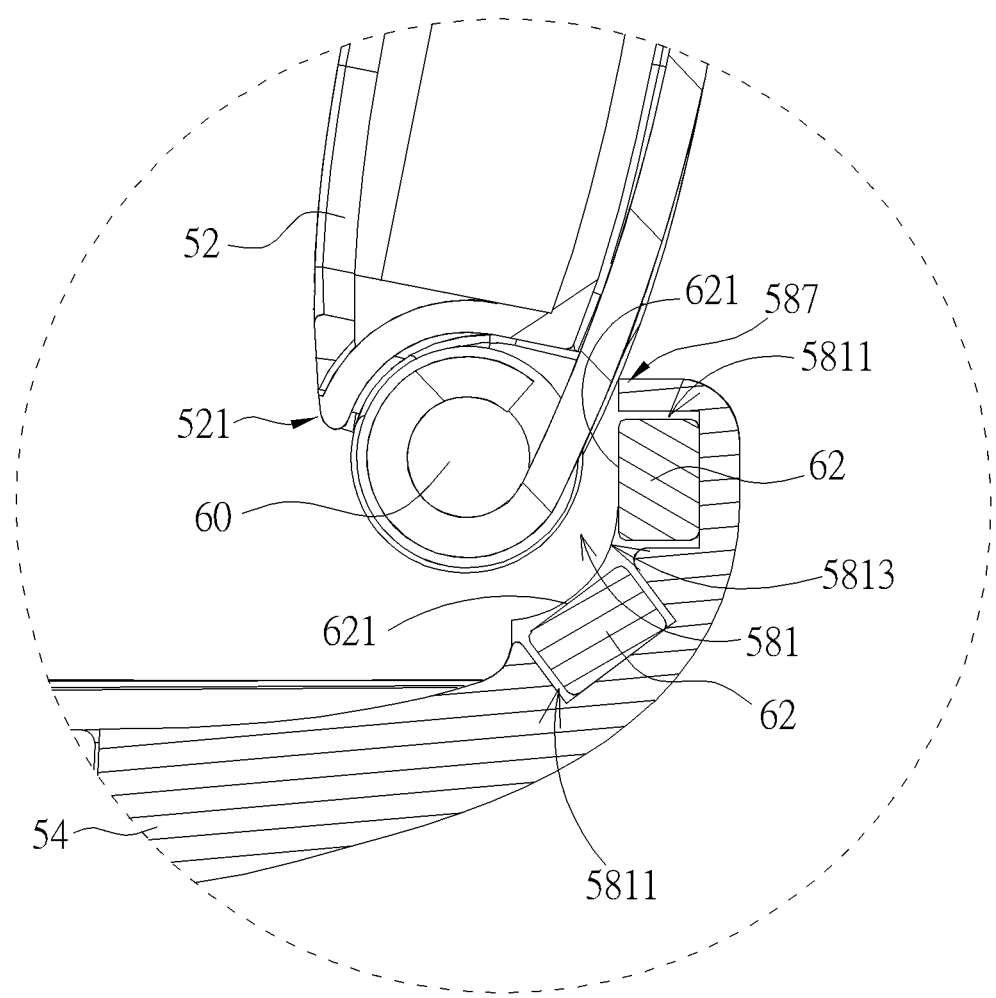
FIG. 8 is a sectional view of the first module separating from the second module according to the embodiment of the present invention.
Figure 9:
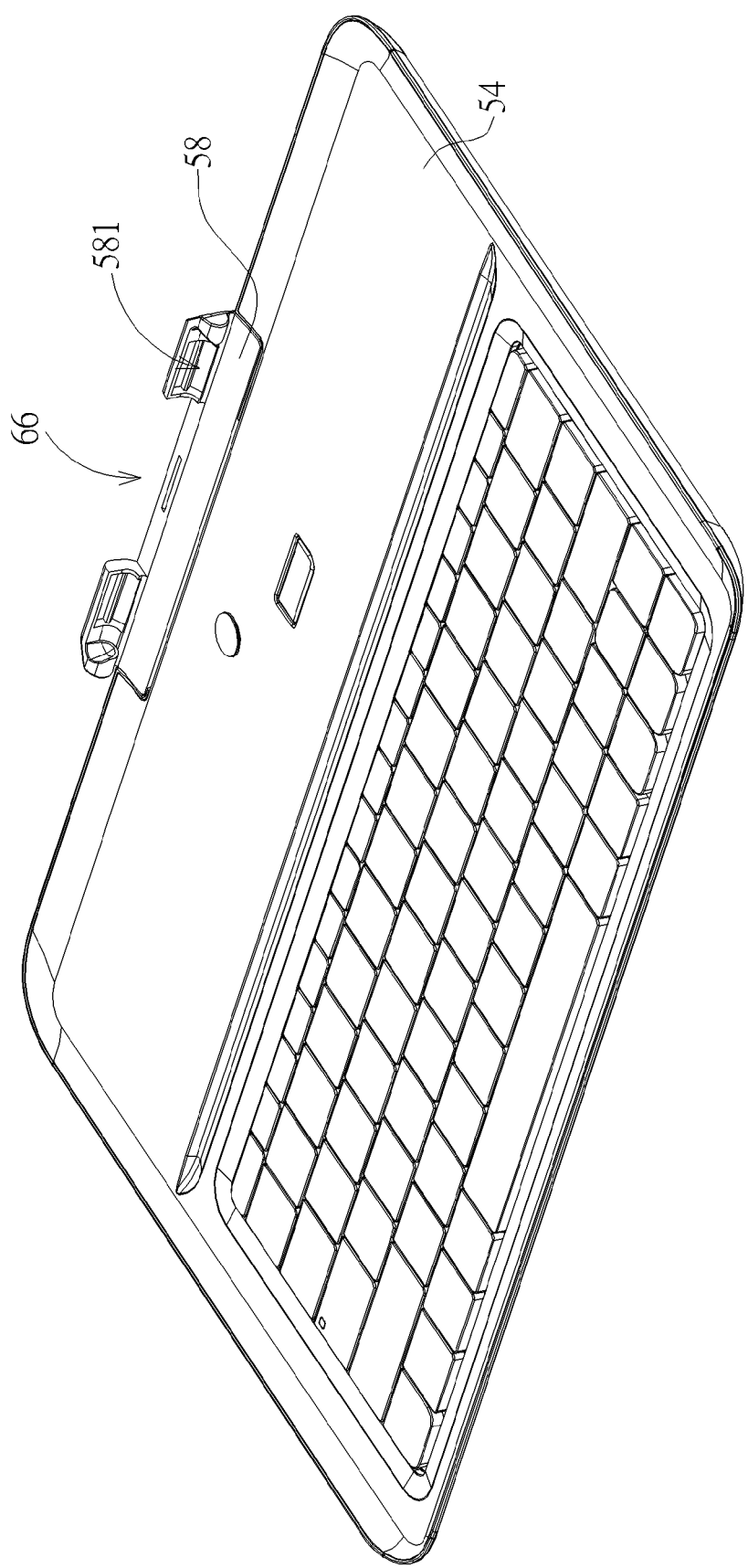
FIG. 9 is a diagram of the second module and a locating component according to another embodiment of the present invention.

Please refer to FIG. 3 and FIG. 8. FIG. 8 is a sectional view of the first module 52 separating from the second module 54 according to the embodiment of the present invention. As the first magnetic component 60 is combined with the second magnetic components 62 to be as the pivotal shaft structure and rotates in the first rotating direction R1 over a predetermined angle by the pivotal shaft structure, the first side 521 of the first module 52 contacts a corner 587 of the locating component 58 to form a fulcrum. The fulcrum is a new pivoting fulcrum, so that the first module 52 continues rotating relative to the second module 54 around the corner 587 as a leverage effect, and the first magnetic component 60 overcomes the magnetic attraction force between the first magnetic component 60 and the second magnetic components 62 by a reverse torque, so that the first module 52 separates from the second module 54. That is, as the first module 52 is to be detached from the second module 54, it only needs to rotate the first module 52 in the first rotating direction R1 relative to the second module 54 around the pivoting fulcrum over the predetermined angle, and then the first module 52 is separated from the second module 54, as shown in FIG. 8. In this embodiment, the predetermined angle can be 90 degrees substantially, but is not limited to it. Moreover, please refer to FIG. 3 and FIG. 9. FIG. 9 is a diagram of the second module 54 and the locating component 58 according to another embodiment of the present invention. As it is desired to design that the first module 52 is not separated from the second module 54 as the first module 52 rotates in the first rotating direction R1 over the predetermined angle, an opening 66 is formed on the accommodating slot 581 of the locating component 58 and for accommodating the supporting component 64 as the first module 52 rotates relative to the second module 54 in the first rotating direction R1 around a combination of the first magnetic component 60 and the second magnetic components 62 over the predetermined angle. Therefore, as the first module 52 rotates relative to the second module 54 over the predetermined angle, such as 90 degrees, the first module 52 is still connected to the second module 54 and is not separated from the second module 54.

Figure 10:
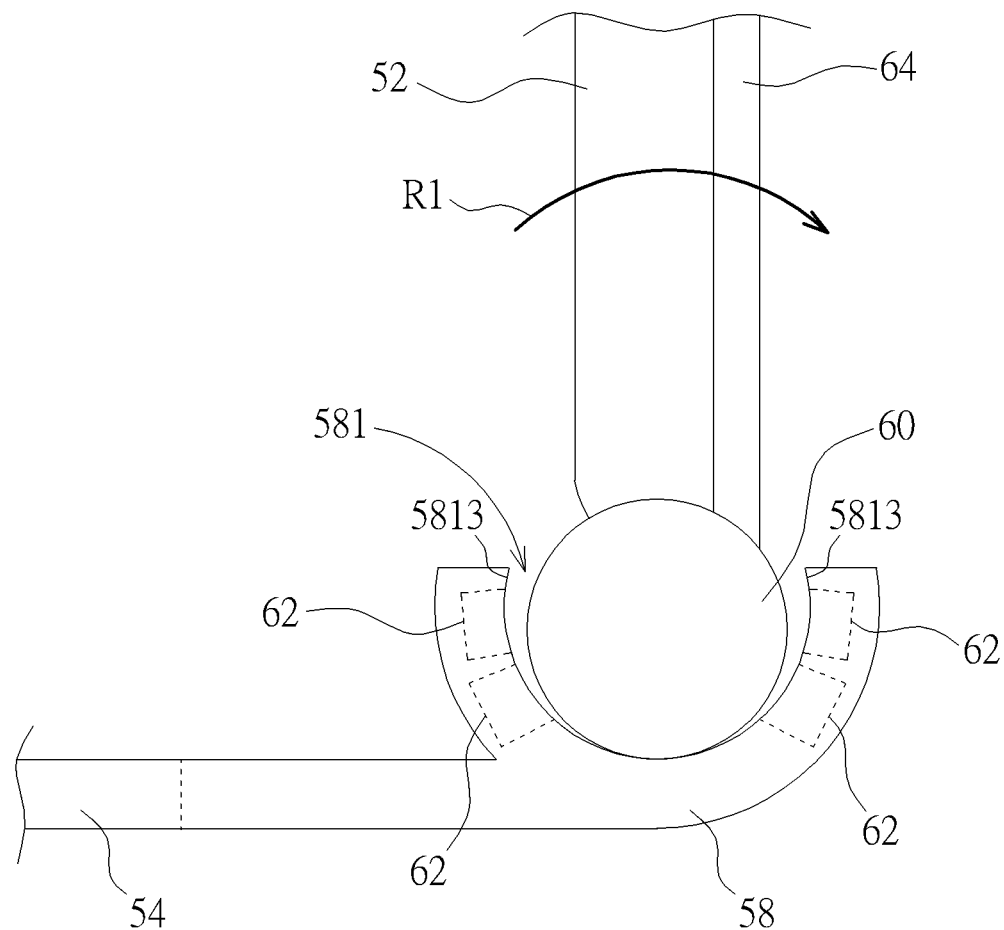
FIG. 10 and FIG. 11 are respectively a side view and a top view of a part of the portable electronic device according to another embodiment of the present invention.
Figure 11:
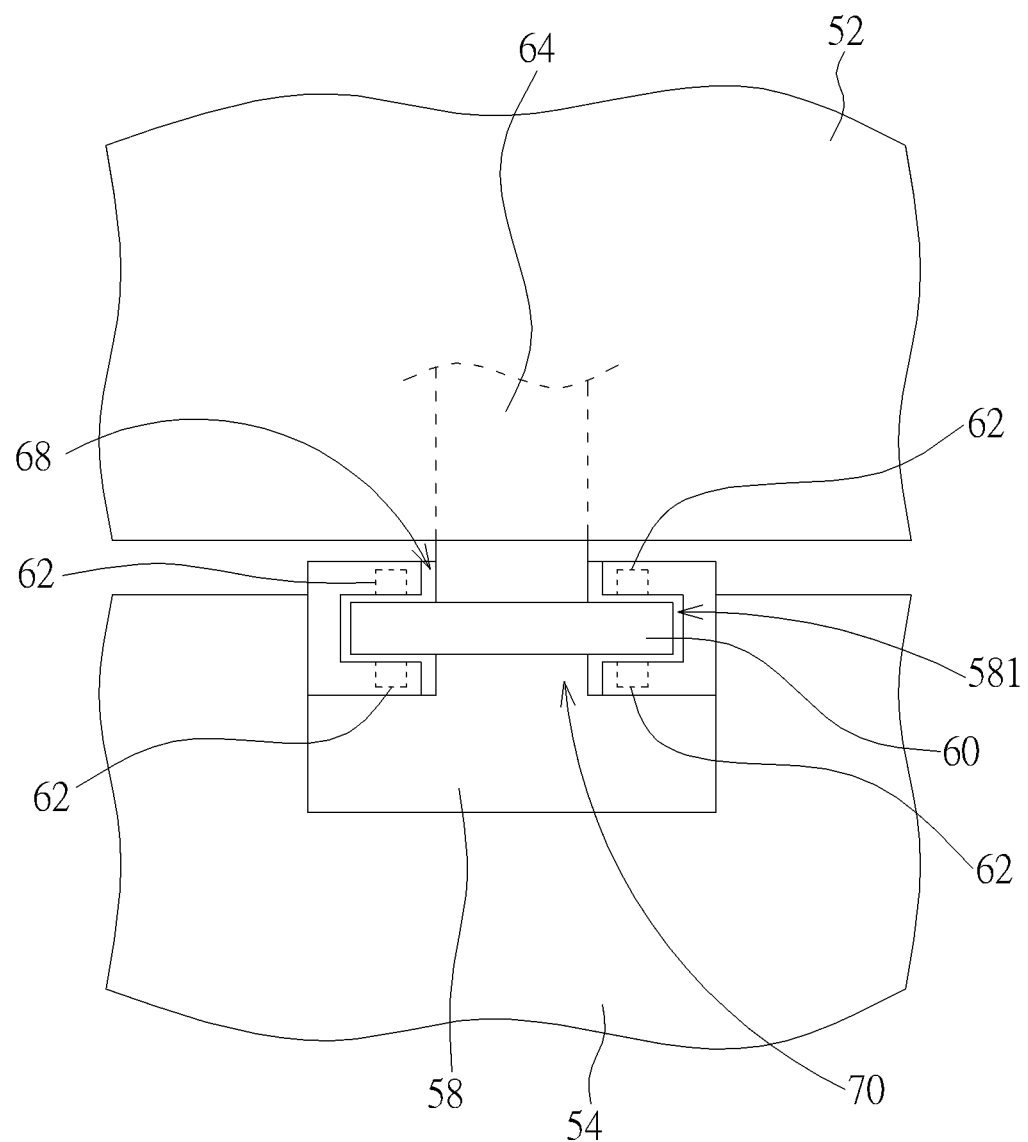

Furthermore, please refer to FIG. 10 and FIG. 11. FIG. 10 and FIG. 11 are respectively a side view and a top view of a part of the portable electronic device 50 according to another embodiment of the present invention. In this embodiment, the accommodating slot 581 can be a U-shaped slot and includes two accommodating surfaces 5813 facing to each other. The plurality of second magnetic components 62 is disposed under each accommodating surface 5813. That is, a pair of the second magnetic components 62 is respectively disposed under two accommodating surfaces 5813 on two sides of the accommodating slot 581 symmetrically. This structural design can ensure that the first magnetic component 60 and the second magnetic components 62 keep attracting each other and provide enough torque as the first module 52 rotates relative to the second module 54 to different angles, so that the first module 52 can rotate relative to the second module more stably and can be fixed at different angles. As the accommodating slot 581 is the U-shaped slot, two openings 68, 70 can be formed on the two sides of the accommodating slot 581 respectively and for increasing a rotating range between the first module 52 and the second module 54. The two opening 68, 70 are for accommodating the supporting component 64 as the first module 52 rotates relative to the second module 54 over a predetermined angle, so as to prevent the first module 52 from interfering with the accommodating slot 581. For example, as shown in FIG. 10, the first module 52 rotates in the first rotating direction R1 relative to the second module 54 to a horizontal position, the opening 68 showed in FIG. 11 can accommodate the supporting component 64.

Figure 12:
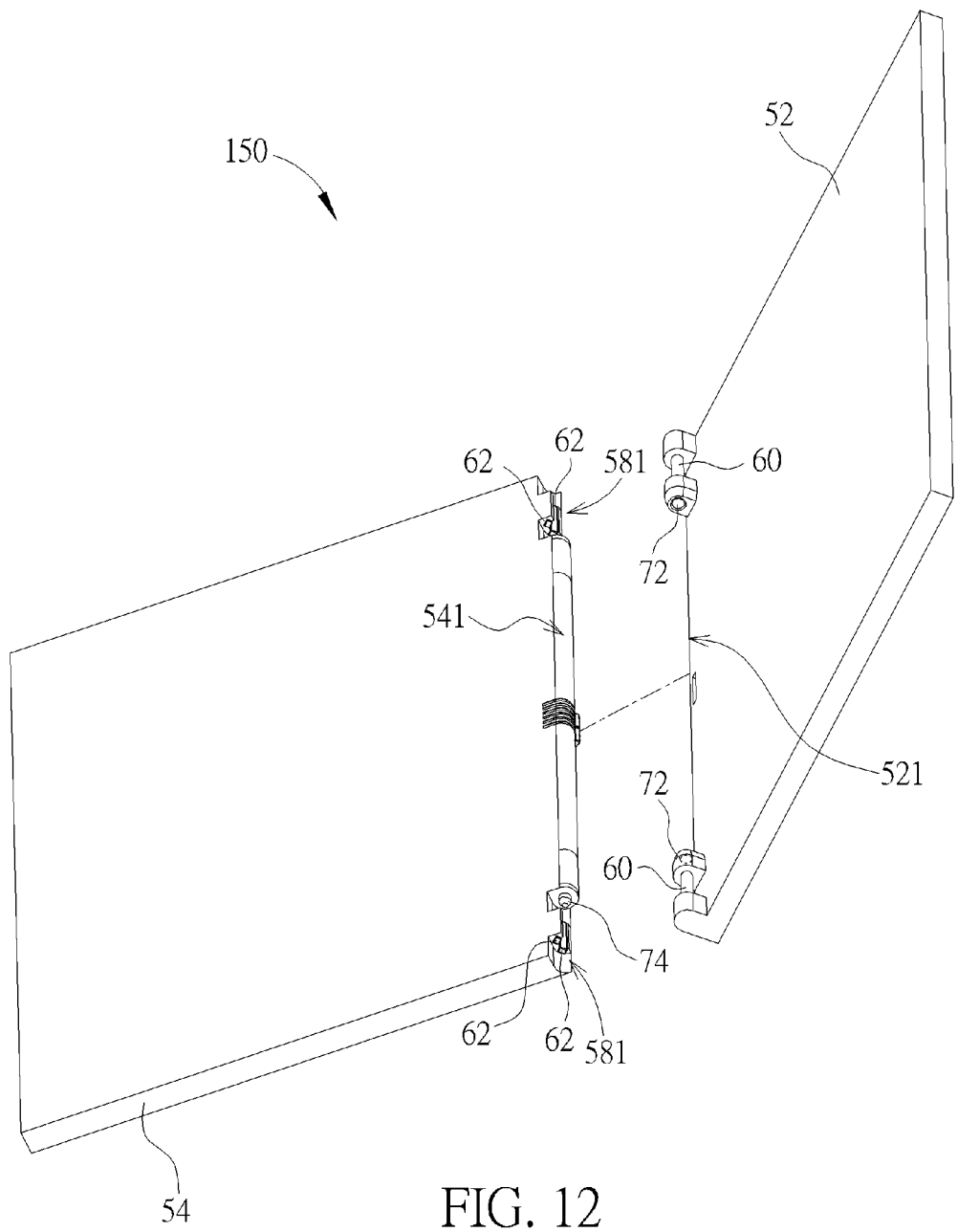
FIG. 12 is an exploded diagram of a portable electronic device according to another embodiment of the present invention.

Please refer to FIG. 12. FIG. 12 is an exploded diagram of a portable electronic device 150 according to another embodiment of the present invention. In this embodiment, the portable electronic device 150 includes two accommodating slots 581 formed on the locating component 58, two first magnetic components 60 and two pairs of second magnetic components 62. The two first magnetic components 60 are respectively disposed on two ends of the first side 521 of the first module 52 corresponding to the two accommodating slots 581. Each pair of second magnetic components 62 corresponding to the two first magnetic components 60 is disposed inside the corresponding accommodating slot 581. That is, there are two second magnetic components 62 disposed inside each accommodating slot 581, and an included angle is formed between each pair of two second magnetic components 62 arranged as shown in FIG. 3. Each pair of two second magnetic components 62 is for attracting the corresponding first magnetic component 60 as the corresponding first magnetic component 60 is disposed in the corresponding accommodating slot 581, so that the first module 52 is assembled with the second module 54 and pivots relative to the second module 54 around the two first magnetic components 60. That is, the two pairs of second magnetic components 62 are connected to the two first magnetic components 60 by the magnetic attraction force, so that the first module 52 is fixed on the second module 54. The two first magnetic components 60 can be combined with the four second magnetic components 62 to act as a pivotal shaft structure, so that the first module 52 can pivot relative to the second module 54 by the pivotal shaft structure. In addition, in this embodiment, the portable electronic device 150 further includes two locating holes 72 and two locating columns 74. The two locating holes 72 are disposed on the two ends of the first side 521 of the first module 52, and two locating columns 74 are disposed on two ends of the second side 541 of the second module 54 and for inserting into the two locating holes 72 respectively as the two pairs of second magnetic components 62 attract the two first magnetic components 60 by the magnetic attraction force, so that the first module 52 is rotatably connected to the second module 54. A structural design for rotating the first module 52 relative to the second module 54 by the magnetic attraction force is not limited to this embodiment and previous embodiments. Structural designs capable of rotating the first module 52 relative to the second module 54 by the magnetic attraction force between the first magnetic component 60 and the second magnetic component 62 are within the scope of the present invention.

In contrast to the prior art, the present invention disposes the first magnetic component on the first module and the second magnetic component on the second module, and the first module can contact and be assembled with the second module easily by the magnetic attraction force between the first magnetic component and the second magnetic component, so that the first module can rotate relative to the second module and provide the torque. As the first module is to be detached from the second module, it only needs to rotate the first module in the first rotating direction over the predetermined angle. Then, the first module rotates around the corner as a leverage effect, so that the first module is separated from the second module by the reverse torque. Therefore, it solves the problems that the tablet computer cannot be separated from the base easily, the tablet computer cannot rotate relative to the base, and the structural design needs more structural space and high cost, in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A portable electronic device, comprising:
   a first module comprising a first side;
   a second module comprising a second side; and
   a pivoting mechanism for connecting the first side of the first module with the second side of the second module, so that the first module is detachably and rotatably assembled with the second module, and the pivoting mechanism comprising:
      a locating component disposed on the second side of the second module, and at least one accommodating slot being formed on the locating component;
      at least one first magnetic component disposed on the first side of the first module and for detachably being contained inside the at least one accommodating slot; and
      at least one second magnetic component disposed inside the at least one accommodating slot and for attracting the at least one first magnetic component magnetically as the at least one first magnetic component is contained inside the at least one accommodating slot, so that the first module is assembled with the second module and pivots relative to the second module around the at least one first magnetic component.

2. The portable electronic device of claim 1, wherein the pivoting mechanism further comprises a supporting component, a first end of the supporting component is pivotally connected to the first module, a second end of the supporting component is connected to the at least one first magnetic component, and the supporting component is for supporting the first module as the first module pivots relative to the first end of the supporting component so that the first side of the first module is disposed on a top surface of the second module.

3. The portable electronic device of claim 2, wherein an opening is formed on the at least one accommodating slot of the locating component and for accommodating the supporting component as the first module rotates relative to the second module in a first rotating direction over a predetermined angle.

4. The portable electronic device of claim 2, wherein a locating slot is disposed on the top surface of the second module and for receiving the first side of the first module as the first module pivots relative to the first end of the supporting component to be disposed on the second module, so as to locate the first module.

5. The portable electronic device of claim 1, wherein the first module is a touch display module, and the second module is a keyboard module.

6. The portable electronic device of claim 1, wherein the first module is a touch display module, and the second module is a host module.

7. The portable electronic device of claim 1, wherein the at least one second magnetic component comprises a plurality of second magnetic components disposed inside the at least one accommodating slot in pairs.

8. The portable electronic device of claim 7, wherein the plurality of second magnetic components is disposed on a side of an accommodating surface of the at least one accommodating slot, and an included angle formed between each pair of the plurality of second magnetic components arranged along the accommodating surface is less than 180 degrees.

9. The portable electronic device of claim 1, wherein the at least one accommodating slot is a U-shaped slot and comprises two accommodating surfaces facing to each other, and at least one second magnetic component is disposed under each accommodating surface.

10. The portable electronic device of claim 9, wherein the pivoting mechanism further comprises a supporting component, a first end of the supporting component is pivotally connected to the first module, a second end of the supporting component is connected to the at least one first magnetic component, two openings are formed on two sides of the at least one accommodating slot respectively and for accommodating the supporting component as the first module rotates relative to the second module in a first rotating direction over a predetermined angle.

11. The portable electronic device of claim 1, wherein the at least one first magnetic component and the at least one second magnetic component are a pivotal shaft structure, as the first module rotates over a predetermined angle in a first rotating direction by the shaft structure, the first side of the first module contacts a corner of the locating component to form a fulcrum, so that the first module separates from the second module by overcoming a magnetic attraction force between the at least one first magnetic component and the at least one second magnetic component.

12. The portable electronic device of claim 7, wherein two accommodating slots are formed on the locating component, and the portable electronic device comprises:
two first magnetic components disposed on two ends of the first side of the first module corresponding to the two accommodating slots; and
two pairs of second magnetic components, each pair of second magnetic components being disposed inside the corresponding accommodating slot and for attracting the corresponding first magnetic component as the corresponding first magnetic component is disposed in the corresponding accommodating slot, so that the first module is assembled with the second module and pivots relative to the second module around the two first magnetic components.

13. The portable electronic device of claim 12, further comprising:
two locating holes disposed on the two ends of the first side of the first module; and
two locating columns disposed on two ends of the second side of the second module and for inserting into the two locating holes respectively as the two pairs of second magnetic components attract the two first magnetic components, so that the first module is rotatably connected to the second module.

14. The portable electronic device of claim 1, wherein one of the at least one first magnetic component and the at least one second magnetic component is an active magnetic component, and the other one of the at least one first magnetic component and the at least one second magnetic component is an active magnetic component or a passive magnetic component.

15. The portable electronic device of claim 14, wherein the active magnetic component is a magnet, and the passive magnetic component is a metal component capable of being attracted by the magnet.

16. The portable electronic device of claim 15, wherein the magnet is a strip-shaped magnet, a U-shaped magnet or a trapezoid magnet.

* * * * *